US012649836B2

(12) United States Patent
Tynys et al.

(10) Patent No.: US 12,649,836 B2
(45) Date of Patent: Jun. 9, 2026

(54) HMS PP FOAM SHEET WITH GOOD COMPRESSIVE STRENGTH AND RECOVERABILITY

(71) Applicant: BOREALIS AG, Vienna (AT)

(72) Inventors: Antti Tynys, Linz (AT); Norbert Reichelt, Linz (AT); Yi An Lin, New Taipei City (CN)

(73) Assignee: BOREALIS AG, Vienna (AT)

( * ) Notice: Subject to any disclaimer, the term of this patent is extended or adjusted under 35 U.S.C. 154(b) by 380 days.

(21) Appl. No.: 18/002,068

(22) PCT Filed: Jun. 24, 2021

(86) PCT No.: PCT/EP2021/067331
§ 371 (c)(1),
(2) Date: Dec. 16, 2022

(87) PCT Pub. No.: WO2021/260101
PCT Pub. Date: Dec. 30, 2021

(65) Prior Publication Data

US 2023/0227620 A1 Jul. 20, 2023

(30) Foreign Application Priority Data

Jun. 26, 2020 (EP) .................................... 20182529

(51) Int. Cl.

| | |
|---|---|
| ***C08J 9/00*** | (2006.01) |
| ***B65D 81/02*** | (2006.01) |
| ***C08J 5/18*** | (2006.01) |
| ***C08J 9/14*** | (2006.01) |
| ***C08K 3/34*** | (2006.01) |
| ***E04B 1/74*** | (2006.01) |
| ***E04F 15/18*** | (2006.01) |

(52) U.S. Cl.
CPC .......... *C08J 9/0066* (2013.01); *B65D 81/022* (2013.01); *C08J 5/18* (2013.01); *C08J 9/141* (2013.01); *C08K 3/34* (2013.01); *C08J 2201/03* (2013.01); *C08J 2203/14* (2013.01); *C08J 2323/12* (2013.01); *C08K 2003/343* (2013.01); *E04B 1/74* (2013.01); *E04F 15/18* (2013.01)

(58) Field of Classification Search
CPC .................................................... C08J 9/00–42
See application file for complete search history.

(56) References Cited

U.S. PATENT DOCUMENTS 5,116,881 A * 5/1992 Park ........................ C08J 9/143
521/134

FOREIGN PATENT DOCUMENTS

| | | | | |
|---|---|---|---|---|
| CN | 106279967 | A | 1/2017 | |
| DE | 19544858 | A1 | 4/1997 | |
| EA | 14000 | B1 | 6/2008 | |
| EP | 0316187 | A2 | 3/1990 | |
| EP | 0520028 | B1 | 12/1992 | |
| EP | 0787750 | A1 | 5/1998 | |
| EP | 0879830 | A1 | 11/1998 | |
| EP | 0890612 | A2 | 7/1999 | |
| EP | 1892264 | A1 | 2/2008 | |
| EP | 2799472 | A1 | 11/2014 | |
| EP | 3127951 | A1 | 2/2017 | |
| JP | 7-266413 | A | 10/1995 | |
| JP | 8-504472 | A | 5/1996 | |
| JP | 2003182005 | A * | 7/2003 | ............. B29C 44/24 |
| JP | 2013-209637 | A | 10/2013 | |
| JP | 2018-59056 | A | 4/2018 | |
| RU | 2526260 | C2 | 8/2014 | |
| RU | 2605398 | C2 | 12/2016 | |
| RU | 2708857 | C2 | 12/2019 | |
| WO | 99/24479 | A1 | 5/1999 | |
| WO | WO2003072644 | A2 | 9/2003 | |
| WO | WO2010098932 | A1 | 9/2010 | |
| WO | 2017/021292 | A1 | 2/2017 | |

OTHER PUBLICATIONS

Machine translation of JP2003182005. Retrieved Oct. 6, 2025.*
Japanese Application No. 2022-577474, Office Action dated Jan. 9, 2024.
Extended European Search Report dated Mar. 2, 2021.
Magnus Kristiansen, et al. "Designer" Nucleating Agents for Polypropylene, Macromolecules 2005, 38, 3688-3695.
Partial European Search Report dated Nov. 26, 2020.
M.H. Wagner, Rheotens-Mastercurves and Drawability of Polymer Melts Polymer Engineering and Science, mid-Apr. 1996, vol. 36, No. 7.
Russian Application No. 2023101157/04, Search Report dated Feb. 28, 2024.
Russian Application No. 2023101157/04, Office Action dated Feb. 29, 2024.
Basov N.I. et al. Quality Control of polymeric Materials. Edited by V.A. Braginsky, 2nd edition, corrected, Leningrad, "Chemistry"], 1990.

(Continued)

*Primary Examiner* — Prashant J Khatri

(74) *Attorney, Agent, or Firm* — Tarolli, Sundheim, Covell & Tummino LLP

(57) ABSTRACT

The present invention relates to a foamed sheet consisting of a polypropylene composition comprising at least 85 wt. %, e.g. from 85 to 99.5 wt.-%, of a high melt strength polypropylene (HMS-PP) and 0.5 to 15 wt. % of a nucleating agent (NA), wherein the foamed sheet has a thickness of below 0.5 mm or a thickness of 2.0 mm or more. The present invention further relates to a foamed material consisting of a polypropylene composition as well as the use of a polypropylene composition comprising at least 85 wt. %, e.g. from 85 to 99.5 wt.-%, of a high melt strength polypropylene (HMS-PP) and 0.5 to 15 wt. % of a nucleating agent (NA) for producing foamed material.

9 Claims, No Drawings

(56) References Cited

OTHER PUBLICATIONS

O.P. Shablova et al. Sound Insulation Characteristics of Foamed Polypropylene Using Example of Vibration and Noise Insulation Material Penotherm PenoProf NPP LE. Construction of unique buildings and structures], 2016, No. 2 (41), pp. 78-90.
Sealing Materials and Gaskets Made thereof. Method for determining compressibility and recoverability, Moscow, All-Union State Standard No. 33784-2016], 2016.
Ivanov A.N. Modification of Structure of Polypropylene under Influence of Small Additions of Nucleators and Molecular Weight Regulators, Ph.D. thesis, Moscow], 2007.
Japanese Application No. 2022-577474, Office Action dated Jun. 25, 2025.
Russian Application No. 2023101157/04, Office Action dated Nov. 3, 2023.
Indian Application No. 202317004181, Office Action dated Feb. 25, 2026.
European Application No. 21737029.5, Office Action dated Mar. 30, 2026.

* cited by examiner

HMS PP FOAM SHEET WITH GOOD COMPRESSIVE STRENGTH AND RECOVERABILITY

SUMMARY OF THE INVENTION

The present invention relates to a foamed sheet consisting of a polypropylene composition comprising at least 85 wt. %, e.g. from 85 to 99.5 wt.-%, of a high melt strength polypropylene (HMS-PP) and 0.5 to 15 wt. % of a nucleating agent (NA), wherein the foamed sheet has a thickness of below 0.5 mm or a thickness of 2.0 mm or more. The present invention further relates to a foamed material consisting of a polypropylene composition as well as the use of a polypropylene composition comprising at least 85 wt. %, e.g. from 85 to 99.5 wt.-%, of a high melt strength polypropylene (HMS-PP) and 0.5 to 15 wt. % of a nucleating agent (NA) for producing foamed material.

BACKGROUND OF THE INVENTION

Foams of different thicknesses are used in a great variety of applications. For example, thick foams are commonly used in packaging as well as in various applications such as in automotive, building and construction. In packaging foams are used to protect goods during transportation, and in the field of building and construction applications, foams are typically used as flooring underlays and insulating materials. An exemplary application for thin foams is in loudspeaker membranes. The foams used in these applications need to have sufficient load bearing capacity (measured as a compressive strength or tensile strength) in combination with good recoverability after releasing the load (measured as an average recoverability after load exposure). Polystyrene and LDPE based foams are commonly used in these applications. The PS foams have excellent load bearing capacity, but the recoverability of the foam is poor. On the other hand, LDPE based foams have good recoverability, but the load bearing capacity is not sufficient. Therefore, the objective has been to develop a foam solution which has good load bearing capacity in combination with excellent recoverability.

DESCRIPTION OF THE INVENTION

The present invention therefor provided in a first embodiment a foamed sheet consisting of a polypropylene composition comprising, preferably consisting of, at least 85 wt. %, e.g. from 85 to 99.5 wt.-%, of a high melt strength polypropylene (HMS-PP) and 0.5 to 15 wt. % of a nucleating agent (NA), the foamed sheet having a thickness of below 0.5 mm or a thickness of 2.0 mm or more.

In a second embodiment the present invention provides a foamed material consisting of a polypropylene composition and fulfilling the following relationships (I) and (II)

$$\text{Compressive strength at 25\% compression/(foam density)}^2 > 0.018\ \text{kPa/(kg/m}^3)^2 \quad \text{(I)}$$

wherein

Compressive strength at 25% is the compressive strength determined according to IOS3386-1 at 25% without pre-compression cycles [0], in kPa Foam density is the density of the foam determined according to ISO 845, in kg/m$^3$;

$$\text{Compressive strength at 40\%/(foam density)}^2 > 0.020\ \text{kPa/(kg/m}^3)^2 \quad \text{(II)}$$

wherein

Compressive strength at 40% is the compressive strength determined according to ISO3386-1 at 40% without pre-compression cycles [0], in kPa Foam density is the density of the foam determined according to ISO 845, in kg/m$^3$ and further having a recoverability determined according to the method specified in the examples herein of at least 85%.

The foamed sheet and foamed material according to the present invention can be provided in different thicknesses. For example, thin foamed sheets and foamed materials can be used in several applications such as loudspeaker membranes usually requiring thicknesses of less than 0.5 mm, while thick foamed sheets and foamed materials are typically used in applications such as flooring underlays and insulating materials, or automotive usually requiring thicknesses of 2.0 mm or more. The inventive foamed sheet and foamed material surprisingly have a good compressibility and, simultaneously a good recoverability thereby overcoming the problems of polystyrene and LDPE based foams as outlined above.

The foamed sheet according to the first embodiment preferably fulfils the following relationship (I)

$$\text{Compressive strength at 25\%/(foam density)}^2 > 0.018\ \text{kPa/(kg/m}^3)^2 \quad \text{(I)}$$

wherein

Compressive strength at 25% is the compressive strength determined according to ISO3386-1 at 25% without pre-compression cycles [0], in kPa Foam density is the density of the foam determined according to ISO 845, in kg/m$^3$.

The foamed sheet according to the first embodiment preferably fulfils the following relationship (II)

$$\text{Compressive strength at 40\%/(foam density)}^2 > 0.020\ \text{kPa/(kg/m}^3)^2 \quad \text{(II)}$$

wherein

Compressive strength at 40% is the compressive strength determined according to ISO3386-1 at 40% without pre-compression cycles [0], in kPa Foam density is the density of the foam determined according to ISO 845, in kg/m$^3$.

The foamed sheet according to the first embodiment preferably has a recoverability determined according to the method specified in the examples herein of at least 85%.

More preferably, the foamed sheet according to the first embodiment fulfils relationships (I) and (II) and has a recoverability determined according to the method specified in the examples herein of at least 85%.

The foamed material according to the second embodiment is preferably in the form of a foamed sheet, wherein the polypropylene composition comprises, preferably consists of, at least 85 wt. %, e.g. from 85 to 99.5 wt.-%, of a high melt strength polypropylene (HMS-PP) and 0.5 to 15 wt. % of a nucleating agent (NA) and the foamed sheet has a thickness of below 0.5 mm or a thickness of 2.0 mm or more.

In the following all embodiments of the present invention including any preferred variants are described unless explicitly stated to the contrary.

High Melt Strength Polypropylene (HMS-PP)

A high melt strength polypropylene is branched and, thus, differs from a linear polypropylene in that the polypropylene backbone covers side chains whereas a non-branched polypropylene, i.e. a linear polypropylene, does not cover side chains. The side chains have significant impact on the rheology of the polypropylene. Accordingly, linear polypropylenes and high melt strength polypropylenes can be clearly distinguished by their flow behavior under stress.

Branching can be generally achieved by using specific catalysts, i.e. specific single-site catalysts, or by chemical modification. Concerning the preparation of a branched polypropylene obtained by the use of a specific catalyst reference is made to EP 1 892 264. With regard to a branched polypropylene obtained by chemical modification it is referred to EP 0 879 830 A1. In such a case the branched polypropylene is also called high melt strength polypropylene. The high melt strength polypropylene (HMS-PP) according to the instant invention is obtained by chemical modification of a polypropylene (PP) as described in more detail below. HMS-PP is commercially available from Borealis AG under the trade name Daploy™.

Therefore the high melt strength polypropylene (HMS-PP) has an $F_{30}$ melt strength of more than 25.0 cN and a $v_{30}$ melt extensibility of more than 205 mm/s, preferably has an $F_{30}$ melt strength of more than 25.0 to 50.0 cN and a $v_{30}$ melt extensibility of more than 205 to 300 mm/s, in order to provide a resulting polypropylene composition with good shear thinning properties. The $F_{30}$ melt strength and the $v_{30}$ melt extensibility are measured according to ISO 16790:2005.

In a preferred embodiment, the high melt strength polypropylene (HMS-PP), has (a) an $F_{30}$ melt strength of more than 25.0 to 45.0 cN, preferably more than 25.0 to 42.0 cN and most preferably more than 25.0 cN to 40.0 cN;

and (b) a $v_{30}$ melt extensibility of 210 to 300 mm/s, more preferably of 215 to 290 mm/s, even more preferably 220 to 270 mm/s and most preferably 225 to 260 mm/s.

In an especially preferred embodiment the high melt strength polypropylene (HMS-PP) has an $F_{30}$ melt strength of more than 25.0 to 45.0 cN and $v_{30}$ melt extensibility of 210 to 300 mm/s, like an $F_{30}$ melt strength of more than 25.0 to 42.0 cN and $v_{30}$ melt extensibility of 215 to 290 mm/s or an $F_{30}$ melt strength of more than 25.0 to 40.0 cN and $v_{30}$ melt extensibility of 220 to 270 mm/s or an $F_{30}$ melt strength of more than 25.0 to 40.0 cN and $v_{30}$ melt extensibility of 225 to 260 mm/s.

Further it is preferred that the high melt strength polypropylene (HMS-PP), has a melt flow rate $MFR_2$ (230° C.) measured according to ISO 1133 of not more than 15.0 g/10 min, more preferably in a range of 0.5 to 15.0 g/10 min, yet more preferably in a range of 1.0 to 15.0 g/10 min, like in the range of 1.5 to 15.0 g/10 min.

In a particularly preferred embodiment the high melt strength polypropylene (HMS-PP), has a melt flow rate $MFR_2$ (230° C.) measured according to ISO 1133 of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min.

Hence in one specific embodiment, the high melt strength polypropylene (HMS-PP), has (a) a melt flow rate $MFR_2$ (230° C.) not more than 15.0 g/10 min, more preferably in a range of 0.5 to 15.0 g/10 min, yet more preferably in a range of 1.0 to 15.0 g/10 min, like in the range of 1.5 to 15.0 g/10 min; and (b) an $F_{30}$ melt strength of more than 25.0 cN, preferably more than 25.0 to 50.0 cN, more preferably more than 25.0 to 45.0 cN, even more preferably more than 25.0 to 42.0 cN and most preferably more than 25.0 cN to 40.0 cN; and (c) a $v_{30}$ melt extensibility of more than 205 mm/s, preferably more than 205 to 300 mm/s, more preferably 210 to 300 mm/s, even more preferably of 215 to 290 mm/s, still more preferably 220 to 270 mm/s and most preferably 225 to 260 mm/s.

In a particularly preferred embodiment, the high melt strength polypropylene (HMS-PP), has (a) a melt flow rate $MFR_2$ (230° C.) not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min; and (b) an $F_{30}$ melt strength of more than 25.0 cN, preferably more than 25.0 to 50.0 cN, more preferably more than 25.0 to 45.0 cN, even more preferably more than 25.0 to 42.0 cN and most preferably more than 25.0 cN to 40.0 cN; and (c) a $v_{30}$ melt extensibility of more than 205 mm/s, preferably more than 205 to 300 mm/s, more preferably 210 to 300 mm/s, even more preferably of 215 to 290 mm/s, still more preferably 220 to 270 mm/s and most preferably 225 to 260 mm/s.

Accordingly in a specific embodiment the high melt strength polypropylene (HMS-PP), has a melt flow rate $MFR_2$ (230° C.) in a range of 0.5 to 15.0 g/10 min, an $F_{30}$ melt strength of more than 25.0 to 45.0 cN and $v_{30}$ melt extensibility of 210 to 300 mm/s, like a melt flow rate $MFR_2$ (230° C.) in a range of 1.0 to 15.0 g/10 min, an $F_{30}$ melt strength of more than 25.0 to 42.0 cN and $v_{30}$ melt extensibility of 215 to 290 mm/s or a melt flow rate $MFR_2$ (230° C.) in a range of 1.0 to 15.0 g/10 min, an $F_{30}$ melt strength of more than 25.0 to 40.0 cN and $v_{30}$ melt extensibility of 220 to 270 mm/s or a melt flow rate $MFR_2$ (230° C.) in a range of 1.5 to 15.0 g/10 min, an $F_{30}$ melt strength of more than 25.0 to 40.0 cN and $v_{30}$ melt extensibility of 225 to 260 mm/s.

Accordingly in another specific embodiment the high melt strength polypropylene (HMS-PP), has a melt flow rate $MFR_2$ (230° C.) in a range of 0.5 to 7.0 g/10 min, an $F_{30}$ melt strength of more than 25.0 to 45.0 cN and $v_{30}$ melt extensibility of 210 to 300 mm/s, like a melt flow rate $MFR_2$ (230° C.) in a range of 1.0 to 15.0 g/10 min, an $F_{30}$ melt strength of more than 25.0 to 42.0 cN and $v_{30}$ melt extensibility of 215 to 290 mm/s or a melt flow rate $MFR_2$ (230° C.) in a range of 1.0 to 6.0 g/10 min, an $F_{30}$ melt strength of more than 25.0 to 40.0 cN and $v_{30}$ melt extensibility of 220 to 270 mm/s or a melt flow rate $MFR_2$ (230° C.) in a range of 1.5 to 5.0 g/10 min, an $F_{30}$ melt strength of more than 25.0 to 40.0 cN and $v_{30}$ melt extensibility of 225 to 260 mm/s.

Preferably, the high melt strength polypropylene (HMS-PP), has a melting point of at least 130° C., more preferably of at least 135° C. and most preferably of at least 140° C. The crystallization temperature is preferably at least 110° C., more preferably at least 120° C.

Further, the high melt strength polypropylene (HMS-PP), can be a high melt strength random propylene copolymer (R-HMS-PP), or a high melt strength propylene homopolymer (H-HMS-PP), the latter being preferred.

For the purpose of the present invention, the expression “propylene homopolymer” refers to a polypropylene that consists substantially, i.e. of at least 97 mol.-%, preferably of at least 98 mol.-%, more preferably of at least 99 mol.-%, most preferably of at least 99.8 mol.-% of propylene units. In a preferred embodiment only propylene units in the propylene homopolymer are detectable.

In case the high melt strength polypropylene (HMS-PP), is a high melt strength random propylene copolymer (R-HMS-PP), it comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the high melt strength random propylene copolymer (R-HMS-PP), comprises, especially consists of, monomers copolymerizable with propylene from the group consisting of ethylene, 1 butene and 1-hexene. More specifically the high melt strength random propylene copolymer (R-HMS-PP), comprises—apart from propylene—units derivable from ethylene and/or 1-butene. In a preferred embodiment the high melt strength random propylene copolymer (R-HMS-PP), consists of units derivable from ethylene and propylene only. The comonomer content in the high melt strength random propylene copolymer (R-HMS-PP), is preferably in the range of more than 0.2 to 10.0 mol.-%, still more preferably in the range of more than 0.5 to 7.0 mol.-%.

In this regard it is to mention that the high melt strength polypropylene (HMS-PP) being either a high melt strength propylene homopolymer (H-HMS-PP) or a high melt strength random propylene copolymer (R-HMS-PP) may comprise additionally unsaturated monomers different to the comonomers defined for the high melt strength random propylene copolymer (R-HMS-PP). In other words the high melt strength propylene homopolymer (H-HMS-PP) or the high melt strength random propylene copolymer (R-HMS-PP) may comprise unsaturated units, like bifunctionally unsaturated monomer(s) and/or multifunctionally unsaturated low molecular weight polymer(s) as defined in detail below, being different to propylene, ethylene and other $C_4$ to $C_{12}$ α-olefins. Accordingly the definition of homopolymer and copolymer in view of the high melt strength polypropylene (HMS-PP) refers actually to the unmodified polypropylene, i.e. to the polypropylene (PP), which is preferably a linear polypropylene (1-PP), used to obtain the melt strength polypropylene (HMS-PP) by chemical modification as defined in detail below.

Accordingly in one preferred embodiment the high melt strength polypropylene (HMS-PP), comprises (a) if it is a high melt strength propylene homopolymer (H-HMS-PP) units derived from (i) propylene and (ii) bifunctionally unsaturated monomer(s) and/or multifunctionally unsaturated low molecular weight polymer(s), or (b) if it is a high melt strength random propylene copolymer (R-HMS-PP) units derived from (i) propylene (ii) ethylene and/or $C_4$ to $C_{12}$ α-olefins, e.g. 1-butene and/or 1-hexene, preferably erthylene, and (iii) bifunctionally unsaturated monomer(s) and/or multifunctionally unsaturated low molecular weight polymer(s), "Bifunctionally unsaturated" or "multifunctionally unsaturated" as used above means preferably the presence of two or more non-aromatic double bonds, as in e.g. divinylbenzene or cyclopentadiene or polybutadiene. Only such bi- or multifunctionally unsaturated compounds are used which can be polymerized preferably with the aid of free radicals (see below). The unsaturated sites in the bi- or multifunctionally unsaturated compounds are in their chemically bound state not actually "unsaturated", because the double bonds are each used for a covalent bond to the polymer chains of the unmodified polypropylene, i.e. of the polypropylene (PP), preferably of the linear polypropylene (1-PP).

Reaction of the bifunctionally unsaturated monomer(s) and/or multifunctionally unsaturated low molecular weight polymer(s), preferably having a number average molecular weight (Mn)≤10000 g/mol, synthesized from one and/or more unsaturated monomers with the unmodified polypropylene, i.e. with the polypropylene (PP), preferably with the linear polypropylene (1-PP), are performed in the presence of a thermally free radical forming agent, e. g. decomposing free radical-forming agent, like a thermally decomposable peroxide.

The bifunctionally unsaturated monomers may be divinyl compounds, such as divinylaniline, m-divinylbenzene, p-divinylbenzene, divinylpentane and divinylpropane;

allyl compounds, such as allyl acrylate, allyl methacrylate, allyl methyl maleate and allyl vinyl ether;

dienes, such as 1,3-butadiene, chloroprene, cyclohexadiene, cyclopentadiene, 2,3-dimethylbutadiene, heptadiene, hexadiene, isoprene and 1,4-pentadiene;

aromatic and/or aliphatic bis (maleimide) bis (citraconimide) and mixtures of these unsaturated monomers.

Especially preferred bifunctionally unsaturated monomers are 1,3-butadiene, isoprene, dimethyl butadiene and divinylbenzene.

The multifunctionally unsaturated low molecular weight polymer, preferably having a number average molecular weight (Mn)≤10000 g/mol may be synthesized from one or more unsaturated monomers.

Examples of such low molecular weight polymers are polybutadienes, especially where the different microstructures in the polymer chain, i.e. 1,4-cis, 1,4-trans and 1,2-(vinyl) are predominantly in the 1,2-(vinyl) configuration copolymers of butadiene and styrene having 1,2-(vinyl) in the polymer chain.

A preferred low molecular weight polymer is polybutadiene, in particular a polybutadiene having more than 50.0 wt.-% of the butadiene in the 1,2-(vinyl) configuration.

The high melt strength polypropylene (HMS-PP), may contain more than one bifunctionally unsaturated monomer and/or multifunctionally unsaturated low molecular weight polymer. Even more preferred the amount of bifunctionally unsaturated monomer(s) and multifunctionally unsaturated low molecular weight polymer(s) together in the high melt strength polypropylene (HMS-PP), is 0.01 to 10.0 wt.-% based on said high melt strength polypropylene (HMS-PP).

In a preferred embodiment the high melt strength polypropylene (HMS-PP), is free of additives (A). Accordingly in case the instant polypropylene composition comprises additives (A), these additives (A) are not brought in the polypropylene composition during the manufacture of the high melt strength polypropylene (HMS-PP).

The high melt strength polypropylene (HMS-PP) further preferably has a low gel content usually below 1.00 wt. %. Preferably the gel content is less than 0.80 wt. %, more preferably less than 0.50 wt. %.

As mentioned above, the high melt strength polypropylene (HMS-PP), may be obtained by treating the polypropylene (PP), preferably the linear polypropylene (1-PP), with thermally decomposing radical-forming agents. However, in such a case a high risk exists that the polypropylene (PP), preferably the linear polypropylene (PP), is degraded, which is detrimental. Thus, it is preferred that the chemical modification is accomplished by the additional use of bifunctionally unsaturated monomer(s) and/or multifunctionally unsaturated low molecular weight polymer(s) as chemically bound bridging unit(s). A suitable method to obtain the high melt strength polypropylene (HMS-PP), is for instance disclosed in EP 0 787 750, EP 0 879 830 A1 and EP 0 890 612 A2. All documents are herewith included by reference. Thereby, the amount of thermally decomposing radical-forming agents, preferably of peroxide, is preferably in the range of 0.05 to 3.00 wt.-% based on the amount of the polypropylene (PP). Typically, the thermally decomposing radical-forming agents are added together with the bifunctionally unsaturated monomer(s) and/or with multifunctionally unsaturated low molecular weight polymer(s) to the polypropylene (PP), preferably to the linear polypropylene (1-PP). However it is also possible, but less preferred, that first the bifunctionally unsaturated monomer(s) and/or multifunctionally unsaturated low molecular weight polymer(s) is/are added to the polypropylene (PP), preferably to the linear polypropylene (1-PP), and subsequent the thermally decomposing radical-forming agents, or the other way round, first the thermally decomposing radical-forming agents are added to the polypropylene (PP), preferably to the linear polypropylene (1-PP), and subsequent the bifunctionally unsaturated monomer(s) and/or multifunctionally unsaturated low molecular weight polymer(s).

Concerning the bifunctionally unsaturated monomer(s) and/or multifunctionally unsaturated low molecular weight polymer(s) used for the manufacture of the high melt strength polypropylene (HMS-PP), reference is made to the section above.

As stated above it is preferred that the bifunctionally unsaturated monomer(s) and/or multifunctionally unsaturated low molecular weight polymer(s) are used in the presence of a thermally decomposing free radical-forming agent.

Peroxides are preferred thermally decomposing free radical-forming agents. More preferably the thermally decomposing free radical-forming agents are selected from the group consisting of acyl peroxide, alkyl peroxide, hydroperoxide, perester and peroxycarbonate.

The following listed peroxides are in particular preferred:

Acyl peroxides: benzoyl peroxide, 4-chlorobenzoyl peroxide, 3-methoxybenzoyl peroxide and/or methyl benzoyl peroxide.

Alkyl peroxides: allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide. Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Also contemplated are mixtures of these above listed free radical-forming agents.

A suitable HMS-PP is WB140HMS™ commercially available from Borealis AG.

The Polypropylene (PP)

As mentioned above, the high melt strength polypropylene (HMS-PP), is a modified polypropylene, which is obtained by reacting the polypropylene (PP) with a thermally decomposing free radical-forming agent and optionally with bifunctionally unsaturated monomer(s) and/or with multifunctionally unsaturated low molecular weight polymer(s). The polypropylene (PP) is preferably a linear polypropylene (1-PP)

It is preferred that the polypropylene (PP), preferably the linear polypropylene (1-PP), has a melt flow rate $MFR_2$ (230° C.) measured according to ISO 1133 in the range of 0.1 to 45.0 g/10 min, like of 0.1 to 40.0 g/10 min or 0.1 to 35.0 g/10 min, more preferably of 0.1 to 30.0 g/10 min, still more preferably of 0.1 to 28.0 g/10 min, yet more preferably of 0.1 to 25.0 g/10 min.

The high melt strength polypropylene (HMS-PP) differs from the polypropylene (PP) which is used for its manufacture in that the backbone of the high melt strength polypropylene (HMS-PP) covers side chains whereas the staring product, i.e. the polypropylene (PP) including the preferred linear polypropylene (1-PP), does not cover or nearby does not cover side chains. The side chains have significant impact on the rheology of the polypropylene. Accordingly the starting product, i.e. the polypropylene (PP), and the obtained high melt strength polypropylene (HMS-PP), can be clearly distinguished by its flow behaviour under stress.

Further, as mentioned above the polypropylene (PP) is preferably a linear polypropylene (1-PP). The same considerations apply to the polypropylene (PP') as discussed in detail below which is also in a preferred embodiment a linear polypropylene (1-PP'). Accordingly, throughout the instant invention, the term "linear polypropylene" indicates that the linear polypropylene, shows no or nearby no-branching structure. Due to the absence of branches, the linear polypropylenes, i.e. the linear polypropylene (1-PP) and the linear polypropylene (1-PP'), are preferably featured by a low $v_{30}$ melt extensibility and/or a low $F_{30}$ melt strength.

Thus it is preferred that the linear polypropylene (1-PP) has (a) a $F_{30}$ melt strength of less than 30.0 cN, preferably of less than 27.0 cN, more preferably in the range of 1.0 to less than 30.0 cN, still more preferably in the range of 1.5 to less than 30.0 cN, yet more preferably in the range of 2.0 to less than 27.0 cN, still yet more preferably in the range of 2.5 to less than 27.0 cN; and (b) a $v_{30}$ melt extensibility of below 220 mm/s, preferably of below 210 mm/s, more preferably in the range of 80 to 200 mm/s, most preferably in the range of 100 to 200 mm/s.

In other words it is preferred that the linear polypropylene (1-PP) has a $F_{30}$ melt strength of less than 30.0 cN and a $v_{30}$ melt extensibility of below 220 mm/s, preferably a $F_{30}$ melt strength of less than 27.0 cN and a $v_{30}$ melt extensibility of below 210 mm/s, more preferably a $F_{30}$ melt strength in the range of 1.0 to less than 30.0 cN and a $v_{30}$ melt extensibility in the range of 80 to 200 mm/s, yet more preferably a $F_{30}$ melt strength in the range of 1.5 to less than 30.0 cN and a $v_{30}$ melt extensibility in the range of 100 to 200 mm/s, still yet more preferably a $F_{30}$ melt strength in the range of 2.0 to less than 27.0 cN and a $v_{30}$ melt extensibility in the range of 100 to 200 mm/s, like a $F_{30}$ melt strength in the range of 2.5 to less than 27.0 cN.

Accordingly in one specific embodiment the linear polypropylene (1-PP) has (a) a melt flow rate $MFR_2$ (230° C.) measured according to ISO 1133 in the range of 0.1 to 45.0 g/10 min, like of 0.1 to 40.0 g/10 min or 0.1 to 35.0 g/10 min, more preferably of 0.1 to 30.0 g/10 min, still more preferably of 0.1 to 28.0 g/10 min, yet more preferably of 0.1 to 25.0 g/10 min; and (b) a $F_{30}$ melt strength of less than 30.0 cN, preferably of less than 27.0 cN, more preferably in the range of 1.0 to less than 30.0 cN, still more preferably in the range of 1.5 to less than 30.0 cN, yet more preferably in the range of 2.0 to less than 27.0 cN, still yet more preferably in the range of 2.5 to less than 27.0 cN; and (c) a $v_{30}$ melt extensibility of below 220 mm/s, preferably of below 210 mm/s, more preferably in the range of 80 to 200 mm/s, most preferably in the range of 100 to 200 mm/s.

Therefore, in one specific embodiment the polypropylene (PP) is a linear polypropylene (1-PP) having a melt flow rate $MFR_2$ (230° C.) of 0.1 to 45.0 g/10 min, a $F_{30}$ melt strength of less than 30.0 cN and a $v_{30}$ melt extensibility of below 220 mm/s, preferably a melt flow rate $MFR_2$ (230° C.) in the range of 0.1 to 40.0 g/10 min, a $F_{30}$ melt strength of less than 30.0 cN and a $v_{30}$ melt extensibility of below 210 mm/s, more preferably a melt flow rate $MFR_2$ (230° C.) in the range of 0.1 to 35.0 g/10 min, a $F_{30}$ melt strength in the range of 1.0 to less than 30.0 cN and a $v_{30}$ melt extensibility in the range of 80 to 200 mm/s, yet more preferably a melt flow rate $MFR_2$ (230° C.) in the range of 0.1 to 30.0 g/10 min, a $F_{30}$ melt strength in the range of 1.5 to less than 30.0 cN and a $v_{30}$ melt extensibility in the range of 100 to 200 mm/s, still yet more preferably a melt flow rate $MFR_2$ (230° C.) in the range of 0.1 to 28.0 g/10 min, a $F_{30}$ melt strength in the range of 2.0 to less than 27.0 cN and a $v_{30}$ melt extensibility in the range of 100 to 200 mm/s, like a melt flow rate $MFR_2$ (230° C.) in the range of 0.1 to 25.0 g/10 min, a $F_{30}$ melt strength in the range of 2.5 to less than 27.0 cN and a $v_{30}$ melt extensibility in the range of 100 to 200 mm/s.

Preferably, the polypropylene (PP), preferably the linear polypropylene (1-PP), has a melting point of at least 140° C., more preferably of at least 150° C. and still more preferably of at least 158° C.

The polypropylene (PP), preferably the linear polypropylene (1-PP), can be produced in a known manner for instance by employing a single-site or a Ziegler Natta catalyst. The polypropylene (PP), preferably the linear polypropylene (1-PP), can be a propylene homopolymer (H-PP), preferably a linear propylene homopolymer (1-H-PP), or a propylene copolymer (R-PP), preferably a linear propylene copolymer (1-R-PP). Concerning the comonomer content and type of comonomer it is referred to the information provided above for the high melt strength random propylene copolymer (R-HMS-PP). Preferably the polypropylene (PP) is a linear polypropylene (1-PP). Still more preferably the polypropylene (PP) is a linear propylene homopolymer (1-H-PP). Accordingly, all information provided with regard to melt flow rate $MFR_2$ (230° C.), melting point, $F_{30}$ melt strength, $v_{30}$ melt extensibility, and particle size and particle size distribution, respectively, applies especially for the linear propylene homopolymer (1-H-PP).

In a preferred embodiment the polypropylene (PP), preferably the linear polypropylene (1-PP), is free of additives (A). Accordingly, in case the instant polypropylene composition comprises additives (A), these additives (A) are preferably not brought in the polypropylene composition during the manufacture of the high melt strength polypropylene (HMS-PP).

The Nucleating Agent (NA)

The polypropylene composition (PC) further comprises one or more, preferably one, nucleating agent(s).

In general, it is appreciated that the polypropylene composition (PC) can comprise any nucleating agent(s) typically used in the products to be prepared and known to the skilled person.

For example, suitable nucleating agents include organic alpha-nucleating agents selected from the group of phosphorous based nucleating agents for instance mono-, bis- or tetra-phenyl phosphates or phosphoric acid esters metal salts represented by the following formula (I)

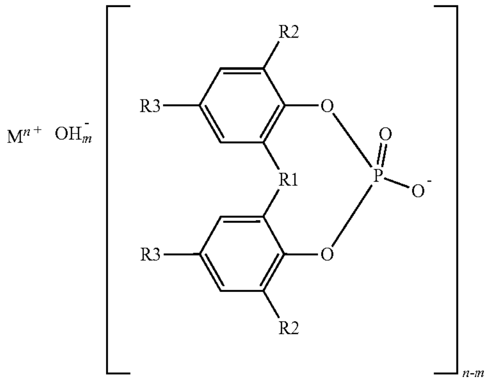

wherein R1 is oxygen, sulphur or a hydrocarbon group of 1 to 10 carbon atoms; each of R2 and R3 is hydrogen or a hydrocarbon or a hydrocarbon group of 1 to 10 carbon atoms; R2 and R3 may be the same or different from each other, two of R2, two of R3, or R2 and R3 may be bonded together to form a ring, M is a monovalent to trivalent metal atom; n is an integer from 1 to 3 and m is either 0 or 1, provided that n>m.

Preferred examples of the alpha nucleating agents represented by the above formula include sodium-2,2'-methylene-bis(4,6-di-tert.-butyl-phenyl)phosphate, sodium-2,2'-ethylidene-bis(4,6-di-tert.-butylphenyl)-phosphate, lithium-2,2'-methylene-bis(4,6-di-tert.-butylphenyl)phosphate, lithium-2,2'-ethylidene-bis(4,6-di-tert.-butylphenyl)phosphate, sodium-2,2'-ethyli-dene-bis(4-i-propyl-6-tert.-butylphenyl)phosphate, lithium-2,2'-methylene-bis(4-methyl-6-tert.-butylphenyl)phosphate, lithium-2,2'-methylene-bis(4-ethyl-6-tert.-butylphenyl)phosphate, calcium-bis[2,2'-thiobis(4-methyl-6-tert.-butyl-phenyl)-phosphate], calcium-bis[2,2'-thiobis(4-ethyl-6-tert.-butylphenyl)-phosphate], calcium-bis[2,2'-thiobis(4,6-di-tert.-butylphenyl)phosphate], magnesium-bis[2,2'-thiobis(4,6-di-tert.-butylphenyl)phosphate], magnesium-bis[2,2'-thiobis(4-t-octylphenyl)phosphate], sodium-2,2'-butylidene-bis(4,6-dimethylphenyl)phosphate, sodium-2,2'-butylidene-bis(4,6-di-tert.-butyl-phenyl)-phosphate, sodium-2,2'-t-octylmethylene-bis(4,6-dimethyl-phenyl)-phosphate, sodium-2,2'-t-octylmethylene-bis(4,6-di-tert.-butylphenyl)-phosphate, calcium-bis[2,2'-methylene-bis(4,6-di-tert.-butylphenyl)-phosphate], magnesium-bis[2,2'-methylene-bis(4,6-di-tert.-butylphenyl)-phosphate], barium-bis[2,2'- methylene-bis(4,6-di-tert.-butylphenyl)-phosphate], sodium-2,2'-methylene-bis(4-methyl-6-tert.-butylphenyl)-phosphate, sodium-2,2'-methylene-bis(4-ethyl-6-tert.-butylphenyl)phosphate, sodium(4,4'-dimethyl-5,6'-di-tert.-butyl-2,2'-biphenyl)phosphate, calcium-bis-[(4,4'-dimethyl-6,6'-di-tert.-butyl-2,2'-biphenyl)phosphate], sodium-2,2'-ethyli-dene-bis(4-m-butyl-6-tert.-butyl-phenyl)phosphate, sodium-2,2'-methylene-bis-(4,6-di-methylphenyl)-phosphate, sodium-2,2'-methylene-bis(4,6-di-t-ethyl-phenyl) phosphate, potassium-2,2'-ethylidene-bis(4,6-di-tert.-butylphenyl)-phosphate, calcium-bis[2,2'-ethylidene-bis(4,6-di-tert.-butylphenyl)-phosphate], magnesium-bis[2,2'-ethyli-dene-bis(4,6-di-tert.-butylphenyl)-phosphate], barium-bis[2,2'-ethylidene-bis-(4,6-di-tert.-butylphenyl)-phosphate], aluminium-hydroxy-bis[2,2'-methylene-bis(4,6-di-tert.-butyl-phenyl)phosphate], aluminium-tris[2,2'-ethylidene-bis(4,6-di-tert.-butylphenyl)-phosphate].

A second group of phosphorous based nucleating agents includes for example aluminium-hydroxy-bis[2,4,8,10-tetrakis(1,1-dimethylethyl)-6-hydroxy-12H-dibenzo4[d,g]-dioxa-phoshocin-6-oxidato] and blends thereof with Li-myristate or Li-stearate.

Also sorbitol-based nucleating agents, like optionally substituted dibenzylidine sorbitol (e.g. 1,3:2,4 Dibenzylidene sorbitol, 1,3:2,4 Di(methylbenzylidene) sorbitol 1,3:2,4 Di(ethylbenzylidene) sorbitol, 1,3:2,4 Bis(3,4-dimethylbenzylidene) sorbitol, etc.) or pine rosin can be used as nucleating agents.

Further suitable alpha-nucleating agents are polymeric nucleating agents selected from the group consisting of vinylcycloalkane polymers and vinylalkane polymers. Nucleation with these polymeric nucleating agents is either accomplished by a special reactor technique, where the catalyst is prepolymerised with monomers like e.g. vinylcyclohexane (VCH), or by blending the propylene polymer with the vinyl(cyclo)alkane polymer. These methods are described in greater detail in e.g. EP 0 316 187 A2 and WO 99/24479, the disclosure of which is incorporated herein by reference.

Suitable alpha-nucleating agents for the polyolefin composition of the invention are in addition nucleating agents, as described for example in Macromolecules 2005, 38, 3688-3695, the disclosure of which is incorporated herein by reference.

Nucleating agents such as ADK NA-11 (Methylen-bis(4,6-di-t-butylphenyl)phosphate sodium salt) and ADK NA-21 (comprising aluminium hydroxy-bis[2,4,8,10-tetrakis(1,1-dimethylethyl)-6-hydroxy-12H-dibenzo-[d,g]-dioxa-phoshocin-6-oxidato]) are also suitable and commercially available from Asahi Denka Kokai. Millad 3988 (3,4-Dimethylbenzylidene sorbitol), Millad 3905 and Millad 3940 available from Milliken & Company are other examples of nucleating agents that can be utilised in the invention.

Further commercial available alpha-nucleating agents, which can be used for the composition of the invention are, for example, Irgaclear XT 386 (N-[3,5-bis-(2,2-dimethyl-propionylamino)-phenyl]-2,2-dimethylpropionamide) from Ciba Speciality Chemicals, Hyperform HPN-68L and Hyperform HPN-20E from Milliken & Company.

Nonitol based nucleating agents, for instance 1,2,3-trideoxy-4,6:5,7-bis-O-((4-propylphenyl) methylene) nonitol (CAS-no. 882073-43-0, e.g. Millad NX8000, supplier Milliken) are also suitable.

Further suitable nucleating agents are the chemical foaming agents available under the tradename “Hydrocerol” from Clariant, Talc is a further suitable nucleating agent.

Talc is particularly preferred. In a preferred embodiment talc is the only nucleating agent present in the polypropylene composition (PC).

The particle size d50 of the nucleating agent, e.g. talc, is within the range of 1 μm to 30 μm, preferably within the range of 2 μm to 25 μm, more preferably within the range of 5 μm to 20 μm and most preferably within the range of 5 μm to 15 μm.

Additives (A)

The additives (A) can be any additives useful in the technical area of the high melt strength polypropylene (HMS-PP) and its applications. Accordingly the additives (A) to be used in the polypropylene composition of the invention and thus in form of the additive mixture (AM) include, but are not limited to, stabilizers such as antioxidants (e.g. sterically hindered phenols, phosphites/phosphonites, sulphur containing antioxidants, alkyl radical scavengers, aromatic amines, hindered amine stabilizers, or blends thereof), metal deactivators (e.g. Irganox MD 1024), or UV stabilizers (e.g. hindered amine light stabilizers). Other typical additives are modifiers such as antistatic or antifogging agents (e.g. ethoxylated amines and amides, or glycerol esters), acid scavengers, cling agents (e.g. polyisobutene), lubricants and resins (ionomer waxes, PE- and ethylene copolymer waxes, Fischer-Tropsch waxes, Montan-based waxes, Fluoro-based compounds, or paraffin waxes), as well as slip and antiblocking agents (e.g. Ca-stearate, erucamide, oleamide, talc natural silica and synthetic silica, or zeolites). Preferably the additives (A) are selected from the group consisting of antioxidants (e.g. sterically hindered phenols, phosphites/phosphonites, sulphur containing antioxidants, alkyl radical scavengers, aromatic amines, hindered amine stabilizers, or blends thereof), metal deactivators (e.g. Irganox MD 1024), UV stabilizers (e.g. hindered amine light stabilizers), antistatic or antifogging agents (e.g. ethoxylated amines and amides, or glycerol esters), acid scavengers, cling agents (e.g. polyisobutene), lubricants and resins (ionomer waxes, PE- and ethylene copolymer waxes, Fischer-Tropsch waxes, Montan-based waxes, Fluoro-based compounds, or paraffin waxes), slip agents (e.g. Ca-stearate), antiblocking agents (e.g. erucamide, oleamide, talc natural silica and synthetic silica, or zeolites) and mixtures thereof.

Preferable additives are slip agents, such as for example Ca-stearate.

As outlined above, the additives (A) do not encompass nucleating agent.

Typically the total amount of additives (A) is not more than 15 wt.-%, more preferably not more than 10 wt.-%, like in the range of 0.1 to 10 wt.-%, preferably 0.1 to 5 wt. %, more preferably 0.2 to 1 wt. % based on the total weight of the polypropylene composition.

Polypropylene Composition

In the first embodiment, as outlined above, the foamed sheet consists of a polypropylene composition comprising at least 85 wt. %, e.g. from 85 to 99.5 wt.-%, of a high melt strength polypropylene (HMS-PP) and 0.5 to 15 wt. % of a nucleating agent (NA).

For example, the foamed sheet consists of a polypropylene composition consisting of at least 85 wt. %, e.g. from 85 to 99.5 wt.-%, of a high melt strength polypropylene (HMS-PP) and 0.5 to 15 wt. % of a nucleating agent (NA).

Preferably, the polypropylene composition according to the first embodiment comprises, preferably consists of, 85 to 95 wt. %, preferably 87.5 to 92.5 wt. % of the high melt strength polypropylene (HMS-PP); and 5.0 to 15 wt. %, preferably 7.5 to 12.5 wt. % of the nucleating agent (NA).

For example, the polypropylene composition according to the first embodiment comprises, preferably consists of, 85 to 95 wt. %, preferably 87.5 to 92.5 wt. % of the high melt strength polypropylene (HMS-PP); and 5.0 to 15 wt. %, preferably 7.5 to 12.5 wt. % of the nucleating agent (NA); and up to 15 wt.-%, preferably in the range of 0.1 to 10 wt.-%, more preferably 0.1 to 5 wt. %, and most preferably 0.2 to 1 wt. % of additives (A).

In the second embodiment, preferably, the polypropylene composition comprises, preferably consists of, at least 85 wt. %, e.g. from 85 to 99.5 wt.-%, more preferably 85 to 95 wt. %, even more preferably 87.5 to 92.5 wt. % of the high melt strength polypropylene (HMS-PP) and 0.5 to 15 wt. %, more preferably 5.0 to 15 wt. %, even more preferably 7.5 to 12.5 wt. % of the nucleating agent (NA).

For example, the polypropylene composition comprises, preferably consists of, at least 85 wt. %, e.g. from 85 to 99.5 wt.-%, more preferably 85 to 95 wt. %, even more preferably 87.5 to 92.5 wt. % of the high melt strength polypropylene (HMS-PP) and 0.5 to 15 wt. %, more preferably 5.0 to 15 wt. %, even more preferably 7.5 to 12.5 wt. % of the nucleating agent (NA), and up to 15 wt.-%, preferably in the range of 0.1 to 10 wt.-%, more preferably 0.1 to 5 wt. %, and most preferably 0.2 to 1 wt. % of additives (A).

In a preferred embodiment, the polypropylene composition comprises, preferably consists of, at least 85 wt. %, e.g. from 85 to 99.5 wt.-%, more preferably 85 to 95 wt. %, even more preferably 87.5 to 92.5 wt. % of the high melt strength polypropylene (HMS-PP) and 0.5 to 15 wt. %, more preferably 5.0 to 15 wt. %, even more preferably 7.5 to 12.5 wt. % of talc as the nucleating agent (NA).

For example, the polypropylene composition comprises, preferably consists of, at least 85 wt. %, e.g. from 85 to 99.5 wt.-%, more preferably 85 to 95 wt. %, even more preferably 87.5 to 92.5 wt. % of the high melt strength polypropylene (HMS-PP) and 0.5 to 15 wt. %, more preferably 5.0 to 15 wt. %, even more preferably 7.5 to 12.5 wt. % of talc as the nucleating agent (NA), and up to 15 wt.-%, preferably in the range of 0.1 to 10 wt.-%, more preferably 0.1 to 5 wt. %, and most preferably 0.2 to 1 wt. % of additives (A).

It is appreciated that, if not stated otherwise, all amounts are based on the total weight of the polypropylene composition.

In the following preferred features of the polypropylene composition according to all embodiments of the invention are described.

In a preferred variant besides the high melt strength polypropylene (HMS-PP), other polymers are only present in a total amount not exceeding 5 wt.-%, more preferably not exceeding 2 wt.-%, still more preferably not exceeding 1 wt.-%, based on the total weight of the polymeric materials present in the polypropylene composition.

As mentioned above the high melt strength polypropylene (HMS-PP), is a major part in the instant polypropylene composition. Accordingly, it is preferred that the final polypropylene composition shows a similar rheology behavior as the high melt strength polypropylene (HMS-PP).

Therefore the polypropylene composition preferably has an $F_{30}$ melt strength of more than 25.0 cN and a $v_{30}$ melt extensibility of more than 205 mm/s, preferably has an $F_{30}$ melt strength of more than 25.0 to 50.0 cN and a $v_{30}$ melt extensibility of more than 205 to 300 mm/s, in order to provide a resulting polypropylene composition with good shear thinning properties. The $F_{30}$ melt strength and the $v_{30}$ melt extensibility are measured according to ISO 16790:2005.

In a preferred embodiment, the polypropylene composition has (a) an $F_{30}$ melt strength of more than 25.0 to 45.0 cN, preferably more than 25.0 to 42.0 cN and most preferably more than 25.0 cN to 40.0 cN;

and (b) a $v_{30}$ melt extensibility of more than 210 to 300 mm/s, more preferably of 215 to 290 mm/s, even more preferably 220 to 270 mm/s and most preferably 225 to 260 mm/s.

In an especially preferred embodiment the polypropylene composition has an $F_{30}$ melt strength of more than 25.0 to 45.0 cN and $v_{30}$ melt extensibility of 215 to 290 mm/s, like an $F_{30}$ melt strength of more than 25.0 to 42.0 cN and $v_{30}$ melt extensibility of 215 to 290 mm/s or an $F_{30}$ melt strength of more than 25.0 to 40.0 cN and $v_{30}$ melt extensibility of 220 to 270 mm/s or an $F_{30}$ melt strength of more than 25.0 to 40.0 cN and $v_{30}$ melt extensibility of 225 to 260 mm/s.

Further it is preferred that the polypropylene composition, has a melt flow rate $MFR_2$ (230° C.) measured according to ISO 1133 of not more than 15.0 g/10 min, more preferably in a range of 0.5 to 15.0 g/10 min, yet more preferably in a range of 1.0 to 15.0 g/10 min, like in the range of 1.5 to 15.0 g/10 min.

In a particularly preferred embodiment the polypropylene composition, has a melt flow rate $MFR_2$ (230° C.) measured according to ISO 1133 of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min.

Hence in one specific embodiment, the polypropylene composition, has (a) a melt flow rate $MFR_2$ (230° C.) not more than 15.0 g/10 min, more preferably in a range of 0.5 to 15.0 g/10 min, yet more preferably in a range of 1.0 to 15.0 g/10 min, like in the range of 1.5 to 15.0 g/10 min;

(b) an $F_{30}$ melt strength of more than 25.0 to 45.0 cN, preferably more than 25.0 to 42.0 cN and most preferably more than 25.0 cN to 40.0 cN; and (c) a $v_{30}$ melt extensibility of more than 210 to 300 mm/s, more preferably of 215 to 290 mm/s, even more preferably 220 to 270 mm/s and most preferably 225 to 260 mm/s.

In a particularly preferred variant of this embodiment the polypropylene composition has a melt flow rate $MFR_2$ (230° C.) measured according to ISO 1133 of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min.

Accordingly in a specific embodiment the polypropylene composition has a melt flow rate $MFR_2$ (230° C.) in a range of 0.5 to 15.0 g/10 min, an $F_{30}$ melt strength of more than 25.0 to 45.0 cN and $v_{30}$ melt extensibility of 215 to 290 mm/s, like a melt flow rate $MFR_2$ (230° C.) in a range of 1.0 to 15.0 g/10 min, an $F_{30}$ melt strength of more than 25.0 to 42.0 cN and $v_{30}$ melt extensibility of 215 to 290 mm/s or a melt flow rate $MFR_2$ (230° C.) in a range of 1.0 to 15.0 g/10 min, an $F_{30}$ melt strength of more than 25.0 to 40.0 cN and $v_{30}$ melt extensibility of 220 to 270 mm/s or a melt flow rate $MFR_2$ (230° C.) in a range of 1.0 to 15.0 g/10 min, an $F_{30}$ melt strength of more than 25.0 to 40.0 cN and $v_{30}$ melt extensibility of 225 to 260 mm/s.

In a particularly preferred variant of this embodiment the polypropylene composition has a melt flow rate $MFR_2$ (230° C.) measured according to ISO 1133 of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min or like in the range of 1.0 to 5.0 g/10 min.

Foamed Sheet

As outlined above, in a first embodiment a foamed sheet consisting of a polypropylene composition comprising at least 85 wt. %, e.g. from 85 to 99.5 wt.-%, of a high melt strength polypropylene (HMS-PP) and 0.5 to 15 wt. % of a nucleating agent (NA), the foamed sheet having a thickness of below 0.5 mm or a thickness of 2.0 mm or more.

In one embodiment, the foamed sheet consists of a polypropylene composition consisting of at least 85 wt. %, e.g. from 85 to 99.5 wt.-%, of a high melt strength polypropylene (HMS-PP) and 0.5 to 15 wt. % of a nucleating agent (NA), the foamed sheet having a thickness of below 0.5 mm or a thickness of 2.0 mm or more.

The foamed sheet can be in the form of a thin foamed sheet, preferably having a thickness of 0.1 to 0.5 mm, more preferably a thickness of 0.3 to 0.5 mm. Alternatively, the foamed sheet can be in the form of a thick foamed sheet, preferably having a thickness of 2.0 to 10 mm, more preferably a thickness of 2.0 to 7.0 mm.

Preferably, the foamed sheet has a density of 50 to 350 $kg/m^3$, more preferably from 75 to 325 $kg/m^3$.

In case the foamed sheet has a thickness of below 0.5 mm, preferably 0.1 mm to 0.5 mm, more preferably 0.3 to 0.5-mm, the foamed sheet preferably has a density of 50 to 350 $kg/m^3$, more preferably from 75 to 325 $kg/m^3$.

In case the foamed sheet has a thickness of 2.0 mm or more, preferably 2.0 to 10 mm, more preferably 2.0 to 7.0 mm, the foamed sheet preferably has a density of 50 to 350 $kg/m^3$, more preferably from 75 to 325 $kg/m^3$ The foam sheet is further characterized by its surface roughness. Usually the surface roughness is below 3.5 μm, preferably below 2.5 μm and most preferably below 1.5 μm.

In one embodiment, the foam sheet may be present as an extrusion laminated or extrusion coated sheet. The skilled person very well knows extrusion laminated or extrusion coated sheets and how to prepare such sheets such that no further information is needed.

The foamed sheet preferably fulfils the following relationship (I)

$$\text{Compressive strength at 25\%/(foam density)}^2 > 0.018\ \text{kPa/(kg/m}^3)^2 \quad \text{(I)}$$

more preferably fulfils the following relationship (Ia)

$$\text{Compressive strength at 25\%/(foam density)}^2 > 0.019\ \text{kPa/(kg/m}^3)^2 \quad \text{(Ia)}$$

wherein

Compressive strength at 25% is the compressive strength determined according to ISO3386-1 at 25% without pre-compression cycles [0], in kPa Foam density is the density of the foam determined according to ISO 845, in $kg/m^3$.

The foamed sheet preferably fulfils the following relationship (II)

$$\text{Compressive strength at 40\%/(foam density)}^2 > 0.023\ \text{kPa/(kg/m}^3)^2 \quad \text{(II)}$$

more preferably fulfils the following relationship (IIa)

$$\text{Compressive strength at 40\%/(foam density)}^2 > 0.020\ \text{kPa/(kg/m}^3)^2 \quad \text{(IIa)}$$

wherein

Compressive strength at 40% is the compressive strength determined according to ISO3386-1 at 40% without pre-compression cycles [0], in kPa Foam density is the density of the foam determined according to ISO 845, in $kg/m^3$.

The foamed sheet preferably fulfils preferably has a recoverability determined according to the method specified in the examples herein of at least 85%.

More preferably the foamed sheet fulfils relationships (I) and (II) and has a recoverability determined according to the method specified in the examples herein of at least 85%, even more preferably the foamed sheet fulfils relationships (Ia) and (IIa) and has a recoverability determined according to the method specified in the examples herein of at least 85%.

Preferably, the entirety of polymeric parts present in the foamed sheet consists of the high melt strength polypropylene (HMS-PP)

The foamed sheet may be a packaging foam, insulating material or flooring underlay, sandwich composites with PP foam core layer, or a foamed sheet used in automotives.

Preferred features of the polypropylene composition are also preferred features of the foamed sheet according to the present invention.

Foamed Article

As outlined above, in a second embodiment the present invention provides a foamed material consisting of a polypropylene composition and fulfilling the following relationships (I) and (II)

$$\text{Compressive strength at 25\% compression/(foam density)}^2 > 0.018\ \text{kPa/(kg/m}^3)^2 \quad \text{(I)}$$

wherein

Compressive strength at 25% is the compressive strength determined according to ISO3386-1 at 25% without pre-compression cycles [0], in kPa Foam density is the density of the foam determined according to ISO 845, in $kg/m^3$;

$$\text{Compressive strength at 40\%/(foam density)}^2 > 0.020\ \text{kPa/(kg/m}^3)^2 \quad \text{(II)}$$

wherein

Compressive strength at 40% is the compressive strength determined according to ISO3386-1 at 40% without pre-compression cycles [0], in kPa Foam density is the density of the foam determined according to ISO 845, in $kg/m^3$ and further having a recoverability determined according to the method specified in the examples herein of at least 85%, more preferably the foamed material fulfils the following relationship (Ia)

$$\text{Compressive strength at 25\%/(foam density)}^2 > 0.019\ \text{kPa/(kg/m}^3)^2 \quad \text{(Ia)}$$

wherein

Compressive strength at 25% is the compressive strength determined according to ISO3386-1 at 25% without pre-compression cycles [0], in kPa Foam density is the density of the foam determined according to ISO 845, in kg/m$^3$;

the following relationship (IIa)

$$\text{Compressive strength at 40\%/(foam density)}^2>0.020\ \text{kPa/(kg/m}^3)^2 \quad \text{(IIa)}$$

wherein

Compressive strength at 40% is the compressive strength determined according to ISO3386-1 at 40% without pre-compression cycles [0], in kPa Foam density is the density of the foam determined according to ISO 845, in kg/m$^3$; and has a recoverability determined according to the method specified in the examples herein of at least 85%.

The foamed material may be in the form of a flat sheet.

Preferably, the foamed article has a density of 50 to 350 kg/m$^3$, more preferably from 75 to 325 kg/m$^3$.

Preferably, the entirety of polymeric parts present in the foamed sheet consists of the high melt strength polypropylene (HMS-PP)

The foamed material is preferably in the form of a foamed sheet, wherein the polypropylene composition comprises, preferably consists of, at least 85 wt. % of a high melt strength polypropylene (HMS-PP) and 0.5 to 15 wt. % of a nucleating agent (NA) and the foamed sheet has a thickness of below 0.5 mm or a thickness of 2.0 mm or more. Preferred features of this variant are given in the foregoing section “foamed sheet”.

The foamed material may be a packaging foam, insulating material or flooring underlay, sandwich composites with PP foam core layer or a foam used in automotives.

Preferred features of the polypropylene composition are also preferred features of the foamed material according to the present invention.

Use

The present invention is furthermore directed to the use of a polypropylene composition comprising, preferably consisting of, at least 85 wt. %, e.g. from 85 to 99.5 wt.-%, of a high melt strength polypropylene (HMS-PP) and 0.5 to 15 wt. % of a nucleating agent (NA) for producing foamed material fulfilling the following relationships (I) and/or (II)

$$\text{Compressive strength at 25\%/(foam density)}^2>0.018\ \text{kPa/(kg/m}^3)^2 \quad \text{(I)}$$

wherein

Compressive strength at 25% is the compressive strength determined according to ISO3386-1 at 25% without pre-compression cycles [0], in kPa Foam density is the density of the foam determined according to ISO 845, in kg/m$^3$ $$\text{Compressive strength at 40\%/(foam density)}^2>0.020\ \text{kPa/(kg/m}^3)^2 \quad \text{(I)}$$

wherein

Compressive strength at 40% is the compressive strength determined according to ISO3386-1 at 40% without pre-compression cycles [0], in kPa Foam density is the density of the foam determined according to ISO 845, in kg/m$^3$.

Preferably, the foamed material has a recoverability determined according to the method specified in the examples herein of at least 85%.

Preferably, the foamed material is a packaging foam, an insulating material or a flooring underlay, or a foam used in automotives.

Preferred features of the polypropylene composition and the foamed sheet and foamed material according to the present invention are also preferred features of the use according to the present invention.

EXAMPLES

A. Measuring Methods

The following definitions of terms and determination methods apply for the above general description of the invention as well as to the below examples unless otherwise defined.

MFR

The MFR of the polypropylenes has been determined according to ISO 1133 under a load of 2.16 kg and at a temperature of 230° C.

Density of the Polymer

The Density was measured according to ISO 1183-1—method A (2004). Sample preparation is done by compression moulding in accordance with ISO 1872-2:2007.

Comonomer Content in Polypropylene

The comonomer content is determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of 250 μm and spectra recorded in transmission mode.

Specifically, the ethylene content of a polypropylene-co-ethylene copolymer is determined using the baseline corrected peak area of the quantitative bands found at 720-722 and 730-733 cm$^{-1}$. Propylene-1-butene-copolymers were evaluated at 767 cm$^{-1}$. Quantitative results are obtained based upon reference to the film thickness.

Melting temperature ($T_m$) and heat of fusion ($H_f$), crystallization temperature ($T_c$) and heat of crystallization ($H_c$): The melting temperature $T_m$ and crystallisation temperature $T_c$ were measured with a TA Instruments Q2000 differential scanning calorimetry device (DSC) according to ISO 11357/3 on 5 to 10 mg samples. Crystallisation and melting temperatures were obtained in a heat/cool/heat cycle with a scan rate of 10° C./min between 30° C. and 225° C. Melting and crystallisation temperatures were taken as the peaks of the endotherms and exotherms in the cooling cycle and the second heating cycle respectively.

$MFR_2$ (230° C.) is measured according to ISO 1133 (230° C., 2.16 kg load).

$F_{30}$ Melt Strength and $v_{30}$ Melt Extensibility

The test described herein follows ISO 16790:2005.

The strain hardening behaviour is determined by the method as described in the article “Rheotens-Mastercurves and Drawability of Polymer Melts”, M. H. Wagner, Polymer Engineering and Sience, Vol. 36, pages 925 to 935. The content of the document is included by reference. The strain hardening behaviour of polymers is analysed by Rheotens apparatus (product of Göttfert, Siemensstr.2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off. The stress on the extrudate is recorded, as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm). The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 mm/sec$^2$. The Rheotens was operated in combination with the PC program EXTENS. This is a real-time data-acquisition program, which displays and stores the measured data of tensile force and drawdown speed. The end points of the Rheotens curve (force versus pulley rotary speed) is taken as the $F_{30}$ melt strength and drawability values.

Gel Content

About 2 g of the polymer ($m_p$) are weighted and put in a mesh of metal which is weighted ($m_{p+m}$). The polymer in the mesh is extracted in a soxhlet apparatus with boiling xylene for 5 hours. The eluent is then replaced by fresh xylene and the boiling is continued for another hour. Subsequently, the mesh is dried and weighted again ($m_{XHU+m}$). The mass of the xylene hot unsolubles ($m_{XHU}$) obtained by the formula $m_{XHU+m}-m_m=m_{XHU}$ is put in relation to the weight of the polymer ($m_p$) to obtain the fraction of xylene insolubles $m_{XHU}/m_p$.

Particle Size/Particle Size Distribution of the Polymer

A gradation test was performed on the polymer samples. The sieve analysis involved a nested column of sieves with wire mesh screen with the following sizes: >20 μm, >32 μm, >63 μm, >100 μm, >125 μm, >160 μm, >200 μm, >250 μm, >315 μm, >400 μm, >500 μm, >710 μm, >1 mm, >1.4 mm, >2 mm, >2.8 mm. The samples were poured into the top sieve which has the largest screen openings. Each lower sieve in the column has smaller openings than the one above (see sizes indicated above). At the base is the receiver. The column was placed in a mechanical shaker. The shaker shook the column. After the shaking was completed the material on each sieve was weighed. The weight of the sample of each sieve was then divided by the total weight to give a percentage retained on each sieve.

Particle Size of the Nucleating Agent

The median particle size $d_{50}$ is calculated from the particle size distribution [mass percent] as determined by gravitational liquid sedimentation according to ISO 13317-3 using a Sedigraph 5100 (Micromeritics Corporation).

Density of the Foam

This has been measured according to ISO 845 using an analytical and semi-micro precision balance of Switzerland PRECISA Gravimetrics AG, Switzerland.

Cell Size Diameter of the Foam

The cell size diameter of the foam was determined using a light optical microscope of Tawain CBS Stereoscopic microscope;

The testing method used is as follows:

1. Cut a strip of the foamed material along the cross direction (CD) and machine direction (MD).
2. Hold the foamed material with a flat clamp and use a razor blade to perform a fine shave.
3. Focus the microscope at 100× and adjust lighting onto the foamed material.
4. Perform length and width measurements of each unique cell in the CD and MD orientation and record values.
5. Count the number of measured unique cells and record the values.
6. Perform cell wall thickness measurements across 3-4 tangent lines to overall length of each unique cell in the CD and MD orientation and record the values.
7. Perform three overall strip thickness measurements starting from the bottom of the first measured cell group, to the middle of the cell group, to the top of the cell group.
8. Perform an overall length measurement starting from the lowest complete cell to the highest complete cell.
9. Move microscope visual field so the bottom of the most upper incomplete cell is touching the bottom of the screen.
10. Repeat steps 4-9 on each new unique cell until about 0.200" to 0.800" of the strip is measured. Ensure that the overall length and cell composition does not overlap. Each overall length measurement after the first measurement is taken from the top of the previous highest complete cell to the top of the current highest complete cell.

Surface Roughness of the Foam

This has been measured using the portable surface roughness tester, model SJ-310 of Mitutoyo, Japan. The surface roughness tester (also known as a profilometer) is a contact surface roughness tester. The roughness determination is fully automated and runs via the included software.

Compressive Strength

The compressive strengths at 25% and 40% are determined according to ISO3386-1 at 25% without pre-compression cycles [0].

Recoverability

The recoverability is determined on a 50×5 mm area specimen, which was cut and plied 6 layers high. The plied sample was measured for initial thickness and then compressed to 50% of its thickness under the Zwick Universal Testing Machine at a preload of 10N at a constant speed of 50 mm/min. The test was performed in normal lab environment set at 23+/−5° C. and 50+/−5% RH. The load was removed immediately and the sample allowed to recover for 5 minutes. The final thickness was then re-measured. The % recoverability was calculated by the following equation:

% recoverability=(final thickness×100)/initial thickness

Open Cell Content

The open cell content was determined according to ASTM D6226.

Tensile Strength and Elongation

The tensile strength and elongation in machine direction (MD) and cross direction (CD) was determined according to ISO 1798.

Flexural Force Maximum, Flexural Strain at Force Maximum, Flexural E-modulus, Flexural Toughness The Flexural force maximum, flexural strain at force maximum, flexural E-modulus, flexural toughness in machine direction (MD) and cross direction (CD) was determined according to ISO 178.

Water Absorption

The water absorption (weight gain) was determined according to ASTM D1056.

Thermal Stability

The thermal stability was determined by exposure to 70° C. for 24 hours according to ASTM D3575 suffix S.

Inventive Example 1 (IE1)

Preparation of a foamed sheet was carried out as follows:

1. dry-blending of Daploy™ WB140HMS ($MFR_2$ (230° C.) measured according to ISO 1133 of 2.1 g/10 min; $F_{30}$ melt strength, determined according to ISO 16790:2005 of 36 cN; $v_{30}$ melt extensibility, determined according to ISO 16790:2005 of 230 mm/s) of Borealis A G (HMS-PP), and of talc in a weight ratio of Daploy™ WB140HMS/talc of 90:10;
2. feeding the blend obtained in the 1st step into a 1st single screw extruder of Pitac Taiwan (screw diameter 90 mm; L/D ratio 26). The extruder is operated at a temperature of 200° C. (5 heating zones: 150° C.; 200° C.; 200° C.; 200° C.; 200° C.) so as to melt the polymer;
3. injecting of 3 wt % liquid butane (as blowing agent), based on the total weight of the blend, in the last section of the 1st single screw extruder obtaining thereby a molten blend;
4. passing the molten blend through a 2nd single screw extruder of Pitac Taiwan (screw diameter 120 mm; L/D ratio 34) thereby cooling down the molten blend to 160° C. at the end of the 2nd single screw extruder;
5. passing the molten blend of the 4th step through an extruding die placed at the end of the 2nd extruder; when exiting the extruder the molten blend is exposed to a pressure drop into atmospheric pressure by the sudden pressure drop the blowing agent in the molten blend expands and thereby accomplishes foaming resulting in a foamed structure; subsequently the foamed structure is cooled at cooling-drums with temperature below 100° C. thereby obtaining a foam sheet having a density of 95.5 $kg/m^3$ and a thickness of 3.0 mm.

Inventive Example 2 (IE2)

The procedure of inventive example 1 was repeated except that the density of the foamed sheet in step 5 was 200.6 $kg/m^3$.

Inventive Example 3 (IE3)

The procedure of inventive example 1 was repeated except that the density of the foamed sheet in step 5 was 285.5 $kg/m^3$.

Comparative Example 1 (CE1)

A foamed sheet of polyethylene was prepared as follows:

1. dry-blending of LD 1925 AS of Tasnee (LDPE), Plastron GMS 50 of Plastron SAS (GMS) and of talc in a weight ratio of LDPE/GMS/talc of 95:3:2;
2. feeding the blend obtained in the 1st step into a 1st single screw extruder of Pitac Taiwan (screw diameter 90 mm; L/D ratio 26). The extruder is operated at a temperature of 185° C. (5 heating zones: 150° C.; 165° C.; 175° C.; 185° C.; 185° C.) so as to melt the polymer;
3. injecting of 8 wt.-% liquid butane (as blowing agent), based on the total weight of the blend, in the last section of the 1st single screw extruder obtaining thereby a molten blend;
4. passing the molten blend through a 2nd single screw extruder of Pitac Taiwan (screw diameter 120 mm; L/D ratio 34) thereby cooling down the molten blend to 100° C. at the end of the 2nd single screw extruder;
5. passing the molten blend of the 4th step through an extruding die placed at the end of the 2nd extruder; when exiting the extruder the molten blend is exposed to a pressure drop into atmospheric pressure by the sudden pressure drop the blowing agent in the molten blend expands and thereby accomplishes foaming resulting in a foamed structure; subsequently the foamed structure is cooled at cooling-drums with temperature below 100° C. thereby obtaining a foam sheet having a density of 30.6 $kg/m^3$ and a thickness of 13 mm.

Comparative Example 2 (CE2)

The procedure of comparative example 1 was repeated except that the sheet thickness was 3 mm and the density of the foamed material was 14.4 $kg/m^3$.

Comparative Example 3 (CE3)

A foamed sheet of polystyrene was prepared as follows:

1. dry-blending of Styrolution PS 168 N/L of Ineos (GPPS), and of talc in a weight ratio of Styrolution PS 168 N/L/talc of 98:2;
2. feeding the blend obtained in the 1st step into a 1st single screw extruder of Pitac Taiwan (screw diameter 90 mm; L/D ratio 26). The extruder is operated at a temperature of 200° C. (5 heating zones: 150° C.; 200° C.; 200° C.; 200° C.; 200° C.) so as to melt the polymer;
3. injecting of 8 wt % liquid butane (as blowing agent), based on the total weight of the blend, in the last section of the 1st single screw extruder obtaining thereby a molten blend;
4. passing the molten blend through a 2nd single screw extruder of Pitac Taiwan (screw diameter 120 mm; L/D ratio 34) thereby cooling down the molten blend to 110° C. at the end of the 2nd single screw extruder;
5. passing the molten blend of the 4th step through an extruding die placed at the end of the 2nd extruder; when exiting the extruder the molten blend is exposed to a pressure drop into atmospheric pressure by the sudden pressure drop the blowing agent in the molten blend expands and thereby accomplishes foaming resulting in a foamed structure; subsequently the foamed structure is cooled at cooling-drums with temperature below 100° C. thereby obtaining a foam sheet having a density of 52.6 $kg/m^3$ and a thickness of 3 mm.

Comparative Example 4 (CE4)

The procedure of comparative example 3 was repeated except that the sheet thickness was 5 mm and the density of the foamed material was 72.2 $kg/m^3$.

The results for inventive examples IE1, IE2 and IE3 as well as comparative examples CE1, CE2, CE3 and CE4 are shown in the following table 1.

TABLE 1 results of the inventive and comparative examples

| | | HMS-PP foam | | | PE foam | | PS foam | |
|---|---|---|---|---|---|---|---|---|
| | unit | IE1 | IE2 | IE3 | CE1 | CE2 | CE3 | CE4 |
| sheet thickness | mm | 3 | 3 | 3 | 13 | 3 | 3 | 5 |
| foam density | $kg/m^3$ | 95.5 | 200.6 | 285.5 | 30.6 | 14.4 | 52.6 | 72.2 |
| open cell content | % | 25.5 | 7.6 | 9.9 | 41.3 | 79.6 | 2.7 | 80.7 |
| tensile strength (MD) | kPa | 1804 | 3906 | 5122 | 322 | 352 | 1362 | 1581 |
| tensile strength (CD) | kPa | 1513 | 4507 | 7202 | 208 | 166 | 1362 | 949 |
| elongation (MD) | % | 33 | 21 | 19 | 107 | 81 | 3 | 3 |
| elongation (CD) | % | 15 | 8 | 8 | 99 | 54 | 4 | 3 |
| compressive strength at 25% | kPa | 214 | 873 | 1734 | 32.7 | 19.5 | 220.8 | 422.2 |
| compressive strength at 40% | kPa | 338 | 1142 | 2282 | 56.4 | 51.4 | 275.5 | 546.3 |
| Recoverability | % | 93.8 | 91.8 | 89.9 | 98.7 | 97.2 | 84.1 | 59.9 |
| Flexural force max.(MD) | N | 5.7 | 12 | 14.7 | 7.8 | 0.1 | 6.3 | 19.7 |
| Flexural force max. (CD) | N | 5 | 22 | 28.9 | 4.8 | 0 | 5.7 | 12.7 |
| Flexural strain at force max.(MD) | mm | 17.2 | 20.3 | 20.4 | 22.5 | 23.5 | 8.6 | 6.4 |
| Flexural strain at force max. (CD) | mm | 10.5 | 17.7 | 21.2 | 24.7 | 20.7 | 9.4 | 10.6 |
| Flexural E-modulus (MD) | MPa | 79.7 | 182.2 | 230.4 | 2.2 | 2.1 | 121.3 | 121.1 |
| Flexural E-modulus (CD) | MPa | 102.8 | 312.2 | 437.4 | 1.2 | 0.3 | 90 | 51.9 |
| flexural toughness (MD) | % | 88 | 97 | 95 | 99.5 | 91.2 | 3 | 3 |
| flexural toughness (CD) | % | 73 | 81 | 97 | 99.8 | 70.5 | 0.9 | 0.3 |
| water absorption | % | 19.3 | n.m. | n.m. | n.m. | 126.1 | 7.7 | 761.3 |
| change in length | % | −0.1 | n.m. | n.m. | n.m. | 0.3 | −0.4 | −0.1 |
| change in width | % | −0.3 | n.m. | n.m. | n.m. | −4.0 | −0.4 | 0.0 |
| change in thickness | % | 3.9 | n.m. | n.m. | n.m. | −0.6 | −0.2 | −1.1 |

n.m. = not measured

As can be seen from table 1 above, the inventive HMS-PP foam samples show excellent load bearing capacity which is comparable with the load bearing capacity of PS foams, expressed by comparable tensile strength and compressive strength. Furthermore, all samples have densities typically achieved for the corresponding kind of foam prepared. However, PS-foams have low recoverability whereas the HMS-PP foam of the present invention shows excellent recoverability, which is comparable with the PE foam. However, PE-foams do not have the load bearing capacity (measured as a compressive strength or tensile strength) of the foam of the present invention (or PS-foams). Thus, the HMS-PP foams of the present invention have a unique combination of properties.

The invention claimed is:

1. A foamed sheet consisting of a polypropylene composition comprising 85 to 95 wt. %, of a high melt strength polypropylene (HMS-PP) and 5.0 to 15 wt. % of a nucleating agent (NA), the foamed sheet having a thickness of 2.0 to 7.0 and a density from 75 to 325 $kg/m^3$.

2. The foamed sheet according to claim 1, fulfilling the following relationship (I):

$$\text{Compressive strength at 25\% compression}/(\text{foam density})^2 > 0.018\ \text{kPa}/(\text{kg/m}^3)^2 \quad \text{(I)}$$

wherein, compressive strength at 25% is the compressive strength determined according to IS03386-1 at 25% without pre-compression cycles [0], in kPa foam density is the density of the foam determined according to ISO 845, in $kg/m^3$.

3. The foamed sheet according to claim 1, fulfilling the following relationship (II):

$$\text{Compressive strength at 40\%}/(\text{foam density})^2 > 0.020\ \text{kPa}/(\text{kg/m}^3)^2 \quad \text{(II)}$$

wherein, compressive strength at 40% is the compressive strength determined according to IS03386-1 at 40% without pre-compression cycles [0], in kPa foam density is the density of the foam determined according to ISO 845 [to be specified], in $kg/m^3$.

4. The foamed sheet according to claim 1, having a recoverability determined according to the method specified in the examples herein of at least 85%.

5. A foamed material consisting of a polypropylene composition, wherein the polypropylene composition comprises 85 to 95% wt. % of a high melt strength polypropylene (HMS-PP) and 5.0 to 15.0 wt. % of a nucleating agent (NA), wherein the foamed material is in the form of a foamed sheet having a thickness of 2.0 to 7.0 mm and a density from 75 to 325 $kg/m^3$ and the foamed material fulfills the following relationships (I) and (II):

$$\text{Compressive strength at 25\% compression}/(\text{foam density})^2 > 0.018\ \text{kPa}/(\text{kg/m}^3)^2 \quad \text{(I)}$$

wherein, compressive strength at 25% is the compressive strength determined according to IS03386-1 at 25% without pre-compression cycles [0], in kPa foam density is the density of the foam determined according to ISO 845, in $kg/m^3$;

$$\text{Compressive strength at 40\%}/(\text{foam density})^2 > 0.020\ \text{kPa}/(\text{kg/m}^3)^2 \quad \text{(II)}$$

wherein, compressive strength at 40% is the compressive strength determined according to IS03386-1 at 40% without pre-compression cycles [0], in kPa foam density is the density of the foam determined according to ISO 845, in $kg/m^3$, and further having a recoverability determined according to the method specified in the examples herein of at least 85%.

6. The foamed sheet or foamed material according to claim 1, wherein the nucleating agent (NA) is talc.

7. The foamed sheet or foamed material according to claim 1, wherein the high melt strength polypropylene (HMS-PP) has an $F_{30}$ melt strength of more than 25.0 cN and/or a $v_{30}$ melt extensibility of more than 205 mm/s, wherein the $F_{30}$ melt strength and the $v_{30}$ melt extensibility are determined according to ISO 16790:2005.

8. The foamed sheet or foamed material according to claim 1, wherein the entirety of polymeric parts present in the foamed sheet or foamed material consists of the high melt strength polypropylene (HMS-PP).

9. The foamed sheet or foamed material according to claim 1, being a packaging foam, insulating material or flooring underlay, sandwich composites with PP foam core layer.

* * * * *